US006181328B1

(12) United States Patent
Shieh et al.

(10) Patent No.: US 6,181,328 B1
(45) Date of Patent: Jan. 30, 2001

(54) METHOD AND SYSTEM FOR CALIBRATING TOUCH SCREEN SENSITIVITIES ACCORDING TO PARTICULAR PHYSICAL CHARACTERISTICS ASSOCIATED WITH A USER

(75) Inventors: Johnny Meng-Han Shieh; John Maddalozzo, Jr.; Gerald Francis McBrearty, all of Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/032,956

(22) Filed: Mar. 2, 1998

(51) Int. Cl.[7] ....................................................... G09G 5/00
(52) U.S. Cl. ............................ 345/178; 345/173; 382/190
(58) Field of Search .................................... 345/178, 173, 345/177, 145; 382/189, 190

(56) References Cited

U.S. PATENT DOCUMENTS

| 4,903,012 | * | 2/1990 | Ohuchi | 340/709 |
| 5,471,226 | * | 11/1995 | Suzuki et al. | 345/173 |
| 5,565,894 | * | 10/1996 | Bates et al. | 345/178 |
| 5,748,512 | * | 5/1998 | Vargas | 345/173 |

\* cited by examiner

Primary Examiner—Steven J. Saras
Assistant Examiner—Tewolde Mengisteab
(74) Attorney, Agent, or Firm—Volel Emile; Felsman, Bradley, Vaden, Gunter & Dillon, LLP

(57) ABSTRACT

A method and system in a data-processing system having a touch-sensitive display unit wherein touch-sensitive icons displayed within the touch-sensitive display unit may be calibrated according to physical characteristics associated with a particular user. Touch-sensitive icons are displayed within a touch-sensitive display unit, such that upon activation by a user, the touch-sensitive icons initiate data-processing operations. Thereafter, a user is prompted to enter a particular sequence of data utilizing the touch-sensitive icons. Physical characteristics associated with the user are then analyzed while the user is entering the particular sequence of data utilizing the touch-sensitive icons. Finally, in response to analyzing the physical characteristics, the touch-sensitive icons are configured such that the sensitivity of the touch-sensitive display may be raised or lowered according to the physical characteristics associated with the user. The touch-sensitive icons may be composed of touch-sensitive keys. The physical characteristics associated with a particular icon can include fingerprint heat or sound wave signatures. The touch sensitive-sensitive display unit itself may be composed of a touch screen display unit having a touch screen keyboard.

12 Claims, 4 Drawing Sheets

METHOD AND SYSTEM FOR CALIBRATING TOUCH SCREEN SENSITIVITIES ACCORDING TO PARTICULAR PHYSICAL CHARACTERISTICS ASSOCIATED WITH A USER

BACKGROUND OF THE INVENTION

1. Technical Field

The present invention relates to improved information-retrieval methods and systems. In particular, the present invention relates to improved information-retrieval methods and systems utilized in association with graphical user interface devices. More particularly, the present invention relates to touch screen display units. Still more particularly, the present invention relates to methods and systems for calibrating touch screen display units.

2. Description of the Related Art

Touch screen technology is increasingly being utilized in all facets of data-processing applications. A touch screen is a display device that allows users to interact with a computer system by touching a particular area on the surface of the screen. Touch screen technology can be implemented by any of a number of sensing techniques. For example, touch screen technology can be implemented by detecting disturbances on a screen utilizing the fingers of a user. Typically, this disturbance is detected through the interruption or detection of heat on the screen.

A problem associated with such a detection technique is that detection sensitivity associated with this interruption is set equally for all portions of the keyboard. An example of such a problem is the "depression" of a character key on a touch screen keyboard wherein the character is depressed by the smallest finger on the hand, such that the finger must stretch outward across the screen to disturb that particular portion of the touch screen.

Users may generally be able to determine if a keystroke is successfully implemented by viewing the resulting input to the screen. However, if the keystroke is not detected, the user must typically type slower or shift more area of his or her finger over the screen area in order to register a depression of a touch screen key value.

Based on the foregoing, it can be appreciated that a need exists for a method and system which would allow a user to calibrate a touch screen to take into account any sensitivities associated with a user's physical characteristics (e.g., heat or sound generated by a user's fingers). Such a method and system, if implemented, would be useful in reducing errors and confusion currently associated with touch screen technology.

SUMMARY OF THE INVENTION

It is therefore an object of the invention to provide an improved information-retrieval method and system.

It is another object of the invention to provide improved information-retrieval methods and systems utilized in association with graphical user interface devices.

It is still another object of the invention to provide an improved touch screen display unit which may be utilized in association with information-retrieval systems.

It is yet another object of the invention to provide a method and system for calibrating touch screen display units.

The above and other objects are achieved as is now described. A method and system are disclosed in a data-processing system having a touch-sensitive display unit wherein touch-sensitive icons displayed within the touch-sensitive display unit may be calibrated according to physical characteristics associated with a particular user. Touch-sensitive icons are displayed within a touch-sensitive display unit, such that upon activation by a user, the touch-sensitive icons initiate data-processing operations. Thereafter, a user is prompted to enter a particular sequence of data utilizing the touch-sensitive icons. Physical characteristics associated with the user are then analyzed while the user is entering the particular sequence of data utilizing the touch-sensitive icons. Finally, in response to analyzing the physical characteristics, the touch-sensitive icons are configured such that the sensitivity of the touch-sensitive display may be raised or lowered according to the physical characteristics associated with the user. The touch-sensitive icons may be composed of touch-sensitive keys. The physical characteristics associated with a particular icon can include finger-print heat or sound wave signatures. The touch sensitive-sensitive display unit itself may be composed of a touch screen display unit having a touch screen keyboard.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
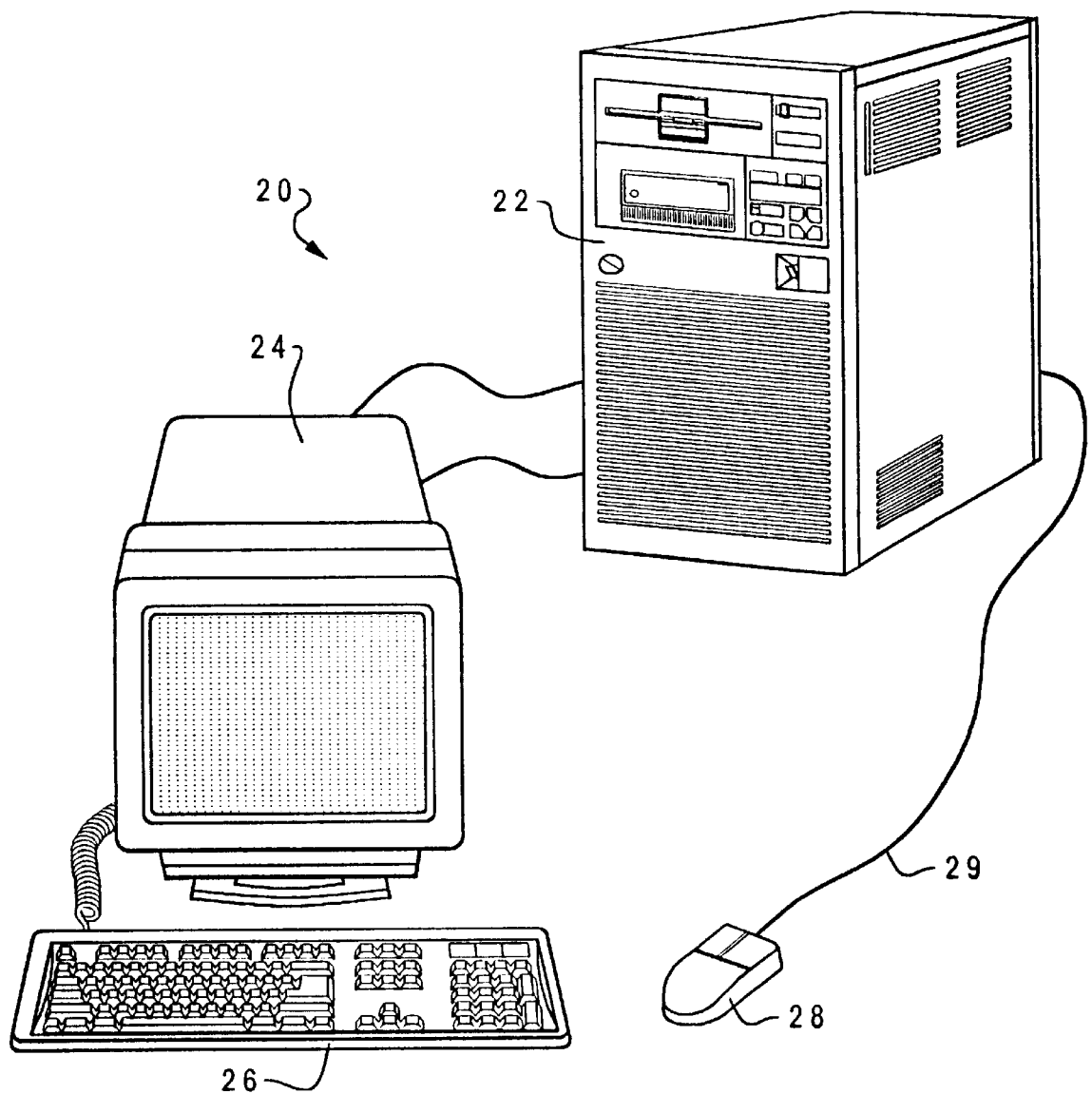
FIG. 1 is a pictorial representation of a data-processing system which can be utilized to implement the method and system of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations or mini-computers. Computer system 20 includes a graphical user interface (GUI) that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation. Those skilled in the art will further appreciate that a touch screen display may be utilized in association computer system 20 to convey visual data and receive input from a user. Such a touch screen may also utilize or incorporate graphical user interface features.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24. Those skilled in the art will of course appreciate that a touch screen display that incorporates features of keyboard 26 (e.g., a touch screen graphically displaying similar "keys") may be utilized in place of or in association with keyboard 26 to receive user input data.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." Mouse 28 may also be utilized in association with a keypad or graphical keyboard displayed on a touch screen.

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 28 is described as a pointing device which may be utilized in accordance with a preferred embodiment of the present invention, those skilled in the art will appreciate that other pointing devices can also be utilized in association with a preferred embodiment of the present invention. Thus, mouse 28 is not a necessary feature of the present invention, but is presented for illustrative purposes only.

Figure 2:
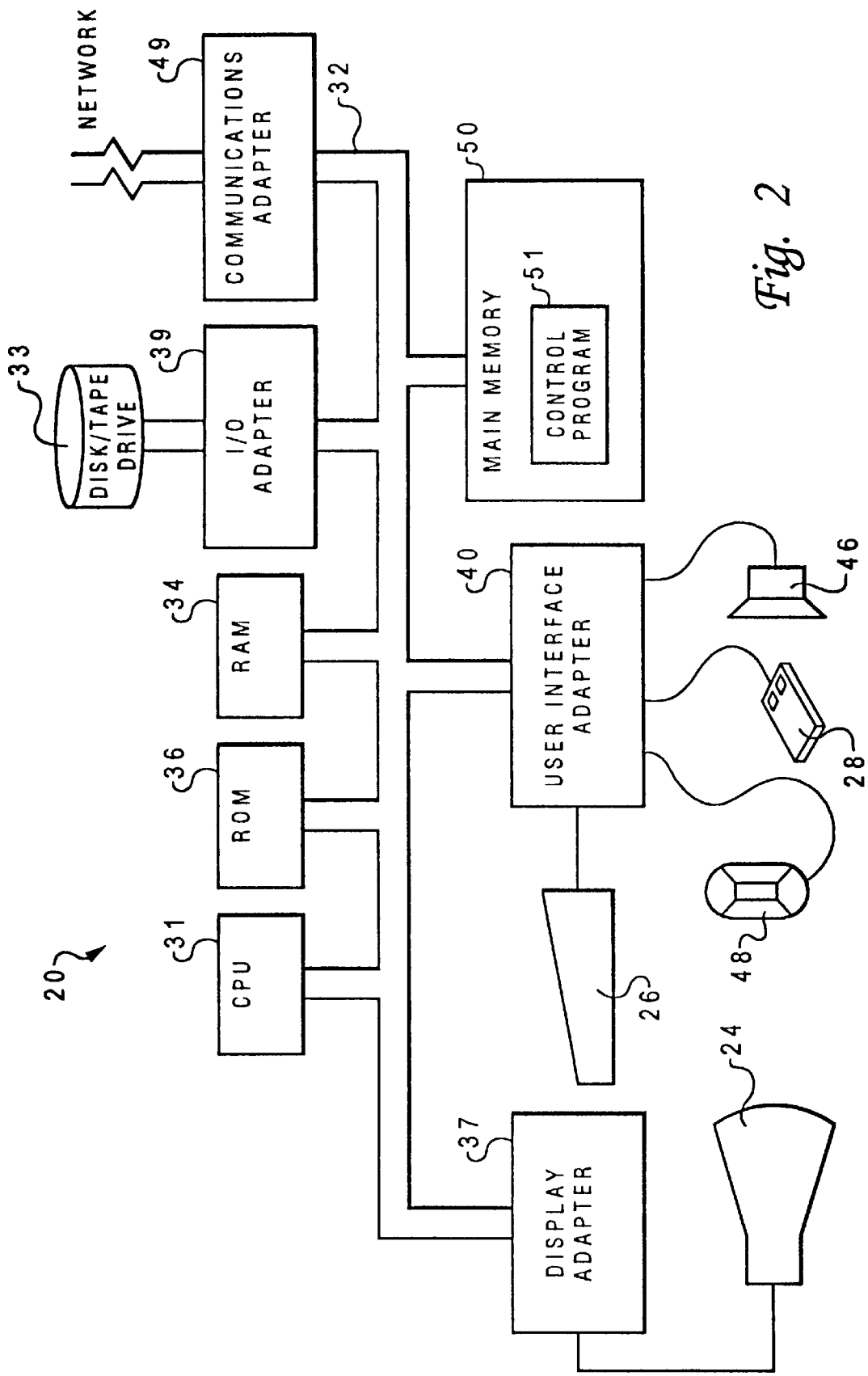
FIG. 2 depicts a representative hardware environment of a computer system in accordance with a preferred embodiment of the present invention.

FIG. 2 depicts a representative hardware environment of a computer system in accordance with a preferred embodiment of the present invention. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid crystal display. Those skilled in the art can thus appreciate that computer system 20 may be implemented as a notebook-based computer. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that possess multiple CPUs and to computer systems that include multiple buses that each perform different functions in different ways.

Computer system 20 also includes a GUI that resides within a machine-readable media to direct the operation of computer system 20. Any suitable machine-readable media may retain the GUI, such as RAM 34, ROM 36, a magnetic diskette, magnetic tape, or optical disk (the last three being located in disk and tape drives 33). Any suitable operating system and associated GUI (e.g., Microsoft Windows) may direct CPU 31. For example, the AIX operating system and AIXwindows windowing system (i.e., GUI) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
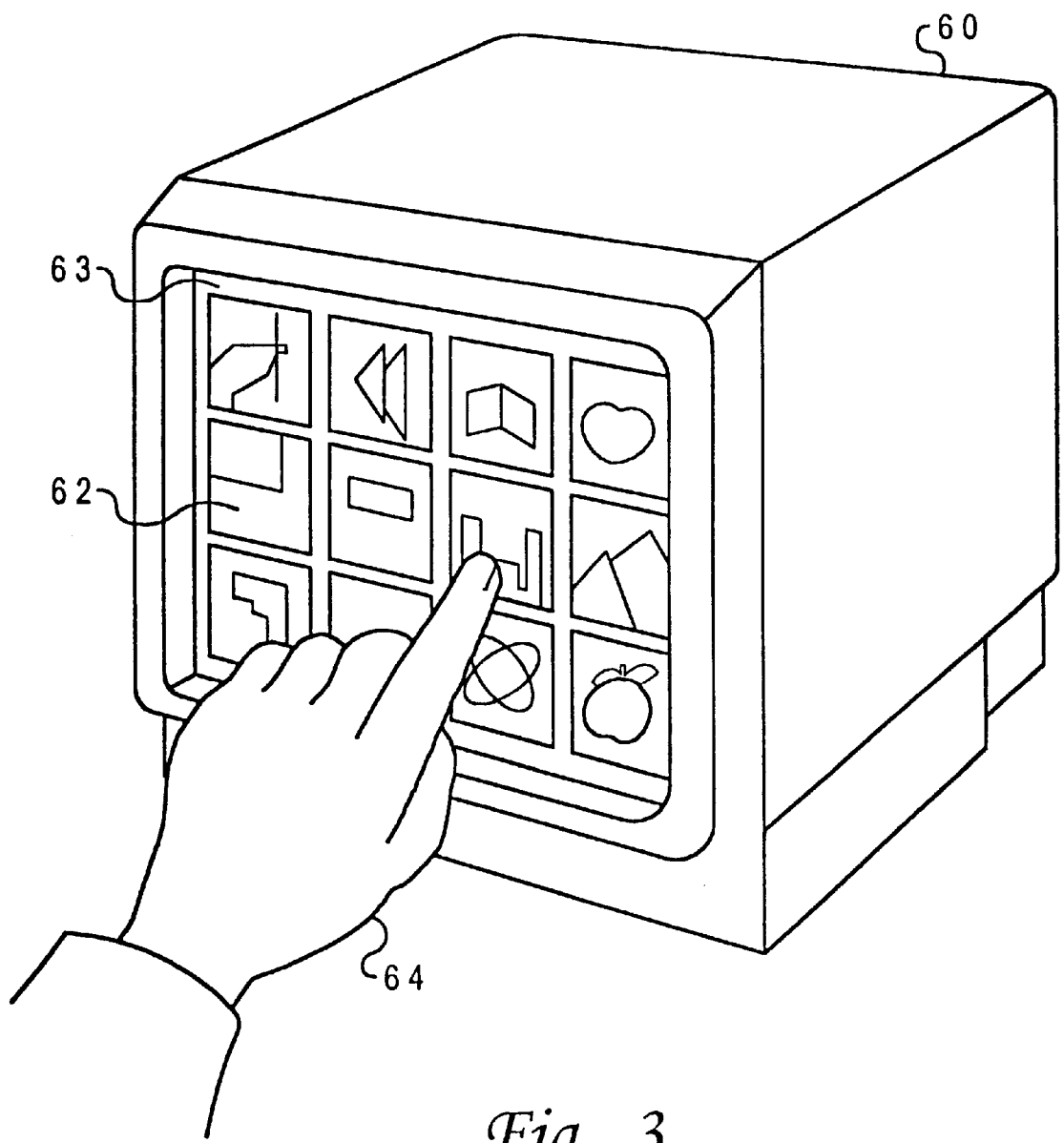
FIG. 3 illustrates a pictorial representation of a touch screen display which may be utilized in accordance with a preferred embodiment of the present invention.

FIG. 3 illustrates a pictorial representation of a touch screen display 60 which may be utilized in accordance with a preferred embodiment of the present invention. Touch screen display 60 may be utilized in association with computer system 20 depicted in FIG. 1 and FIG. 2. In particular, touch screen display 60 may be utilized either in place of or in association with video display 24 of FIG. 1 and FIG. 2. Touch screen display 60 is a specialized computer display screen which is designed to recognize the location of a touch on the surface of the screen (i.e. touch screen 63). By touching the screen, the user can make a selection or move a cursor.

Touch screen display 63 may be composed of one or more sensing line grids, which determine the location of a touch by matching vertical and horizontal contacts. In addition, touch screen display may include an electrically charged surface and sensors around the outer edge of the screen to detect the amount of electrical disruption and pinpoint exactly where contact has been made. Touch screen display 60 may also include infrared light-emitting diodes (LEDs) around the outer edges of the screen (i.e., touch screen 63), which together with additional sensors, create an invisible infrared grid, which the user's finger interrupts, in front of the screen.

Thus, according to the diagram depicted in FIG. 3, a user's hand 64 (i.e., particular a user's fingers) may touch keys 62, which are graphically displayed within touch screen display 60. By touching a particular key, such as a key 62, a series of data-processing operations associated with that particular key, may be initiated. Although not specifically depicted in FIG. 3, those skilled in the art will appreciate that touch screen display 63 may include other key configurations, such as, for example, a graphically displayed keyboard similar in nature to keyboard 26 of FIG. 1. Touch screen 63 of touch screen 60 is thus a display device that allows the user to interact with a computer system, such as computer system 20 of FIG. 1 and FIG. 2, by touching a particular area on the screen.

Figure 4:
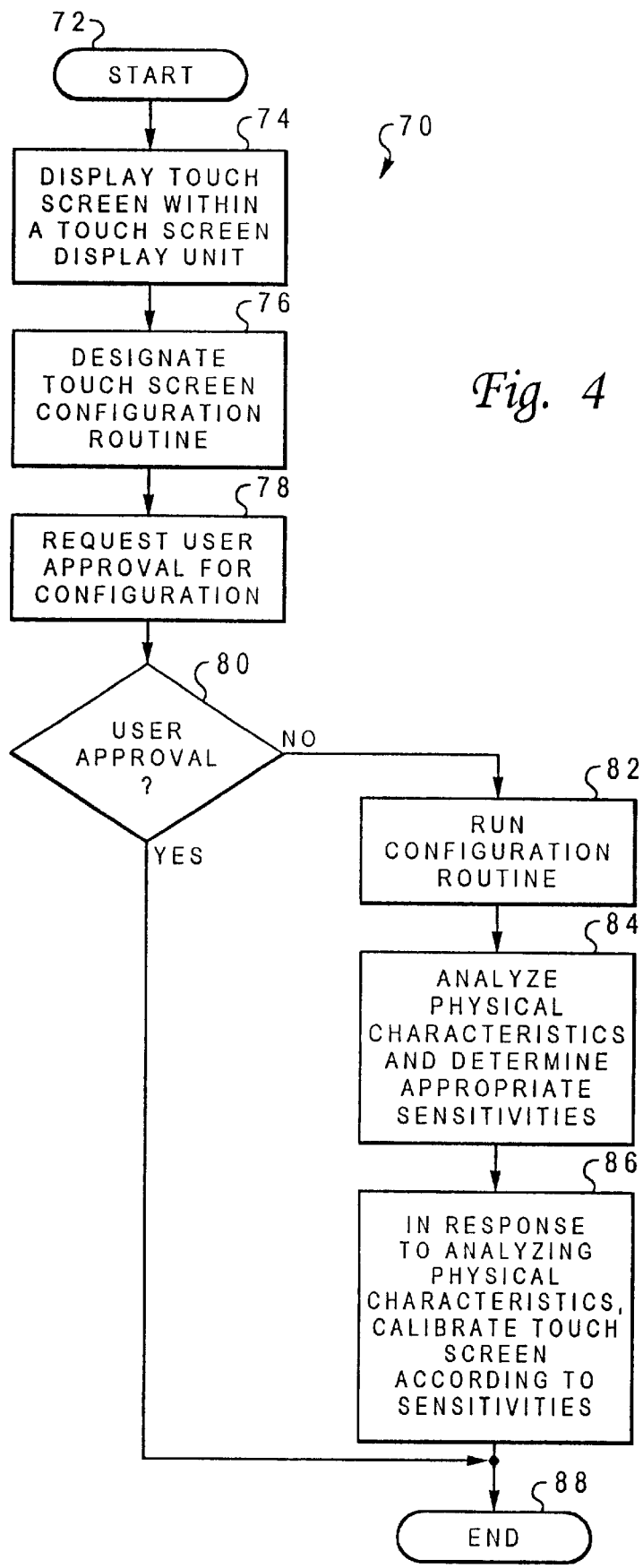
FIG. 4 depicts a high-level flowchart of operations illustrating a method for calibrating touch screen sensitivities, in accordance with a preferred embodiment of the present invention.

FIG. 4 depicts a high-level flowchart of operations 70 illustrating a method for calibrating touch screen sensitivities, in accordance with a preferred embodiment of the present invention. It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1 and FIG. 2, and associated touch screen displays such as the touch screen display depicted in FIG. 3, in processing electrical or other (e.g. mechanical, chemical) physical signals to generate other desired physical signals.

Thus, as depicted at block 72, the process is initiated. As described at block 74, a touch screen is displayed within a touch screen display unit. As illustrated at block 76, a touch screen configuration routine is designated. The touch screen configuration routine, when processed, prompts a user to type out a series of sentences utilizing the touch screen. The configuration routine must be designated ahead of time by the user. The user must designate parameters that the configuration routine will utilize in subsequent data-processing operations. For example, a user can designate particular heat/sound identification criteria according to a particular portion of the touch screen.

As the user types out the sentences, an analysis of the "fingerprint heat/sound" signature is taken. As illustrated at block 78, once the configuration routine is designated, approval must be given by the user to implement the actual configuration routine. As depicted at block 80, a test is performed to determine whether or not user approval for running the configuration routine has been given. If approval by the user is not given, the process ends, as described at block 88. However, if approval by the user is given, then as indicated at block 82, the configuration routine is processed with the parameters set earlier by the user. Thereafter, as illustrated at block 84, the physical characteristics of the user are analyzed while the user types out the set of sentences during running of the configuration routine. Appropriate sensitivities are determined.

As described at block 86, in response to analyzing these physical characteristics, the touch screen is calibrated according to the identified sensitivities. For example, the heat required to depress a touch screen far away is registered. On the other hand, the heat needed to depress a nearby key is also registered such that the touch screen does not register an inadvertent keystroke due to a user's fingers close proximity to the touch screen keyboard. Of course, those skilled in the art will appreciate that other sensitivities may also be identified. For example, sound waves associated with a user's fingers may also be utilized to calibrate the touch screen.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method in a data-processing system having a touch-sensitive display unit wherein touch-sensitive icons displayed within said touch-sensitive display unit may be calibrated according to physical characteristics associated with a particular user, comprising the steps of:

displaying touch-sensitive icons within a touch-sensitive display unit, such that upon activation by a user, said touch-sensitive icons initiate data-processing operations;

prompting a user to enter a particular sequence of data utilizing said touch-sensitive icons;

analyzing physical characteristics associated with said user while said user is entering said particular sequence of data utilizing said touch-sensitive icons, said physical characteristics comprising a fingerprint heat signature and/or a fingerprint sound wave signature; and in response to analyzing said physical characteristics, configuring said touch-sensitive icons such that the sensitivity of said touch-sensitive display may be raised or lowered according to said physical characteristics associated with said user.

2. The method of claim 1 wherein the step of displaying touch-sensitive icons within a touch-sensitive display unit, such that upon activation by a user, said touch-sensitive icons initiate data-processing operations, further comprises the step of:

displaying touch-sensitive icons within a touch-sensitive display unit, such that upon activation by a user, said touch-sensitive icons initiate data-processing operations, wherein said touch-sensitive icons comprise touch-sensitive keys.

3. The method of claim 2 wherein the step of displaying touch-sensitive icons within a touch-sensitive display unit, such that upon activation by a user, said touch-sensitive icons initiate data-processing operations, further comprises the step of:

displaying touch-sensitive icons within a touch-sensitive display unit, such that upon activation by a user, said touch-sensitive icons initiate data-processing operations, wherein said touch-sensitive display unit comprises a touch screen display unit having a touch screen keyboard.

4. A system for calibrating a touch-sensitive display unit of a data-processing system according to physical characteristics associated with a particular user, such that said touch-sensitive display unit includes touch-sensitive keys, said system comprising:

means for displaying touch-sensitive icons within a touch-sensitive display unit, such that upon activation by a user, said touch-sensitive icons initiate data-processing operations;

means for prompting a user to enter a particular sequence of data utilizing said touch-sensitive icons;

means for analyzing physical characteristics associated with said user while said user is entering said particular sequence of data utilizing said touch-sensitive icons, said physical characteristics comprising a fingerprint heat signature and/or a fingerprint sound wave signature; and means for configuring said touch-sensitive icons such that the sensitivity of said touch-sensitive display may be raised or lowered according to said physical characteristics associated with said user, in response to analyzing said physical characteristics.

5. The system of claim 4 wherein said touch-sensitive icons comprise touch-sensitive keys.

6. The system of claim 4 wherein said touch sensitive—sensitive display unit comprises a touch screen display unit having a touch screen keyboard.

7. A program product residing in computer memory in a computer for calibrating a touch-sensitive display unit according to physical characteristics associated with a particular user, such that said touch-sensitive display unit includes touch-sensitive keys, said system comprising:

instruction means residing in a computer memory for displaying touch-sensitive icons within a touch-sensitive display unit, such that upon activation by a user, said touch-sensitive icons initiate data-processing operations;

instruction means residing in a computer memory for prompting a user to enter a particular sequence of data utilizing said touch-sensitive icons;

instruction means residing in a computer memory for analyzing physical characteristics associated with said user while said user is entering said particular sequence of data utilizing said touch-sensitive icons, said physical characteristics comprising a fingerprint heat signature and/or a fingerprint sound wave signature; and instruction means residing in a computer memory for configuring said touch-sensitive icons such that the sensitivity of said touch-sensitive display may be raised or lowered according to said physical characteristics associated with said user, in response to analyzing said physical characteristics.

8. The program product of claim 7 wherein said touch-sensitive icons comprise touch-sensitive keys.

9. The program product of claim 8 wherein said touch sensitive—sensitive display unit comprises a touch screen display unit having a touch screen keyboard.

10. The program product of claim 9 wherein each of said instruction means further comprises signal bearing media.

11. The program product of claim 10 wherein said signal bearing media further comprises transmission media.

12. The program product of claim 10 wherein said signal bearing media further comprises recordable media.

* * * * *